Figure 1:
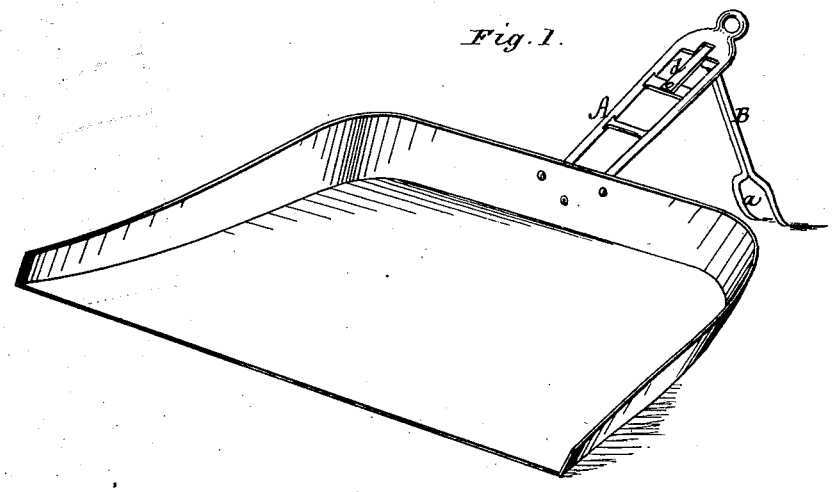
Figure 2:
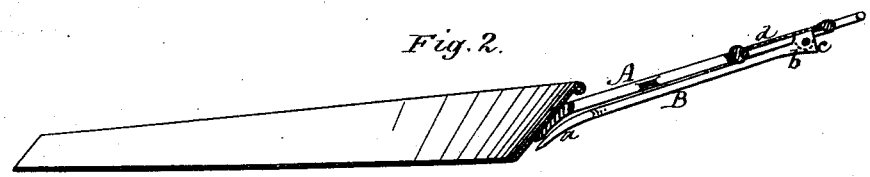

F. D. BLISS.
Dust-Pan.

No. 162,524.

Patented April 27, 1875.

Witnesses:
A. B. Cauldwell
Edmund Masson

Inventor:
Francis D. Bliss,
By Wm. C. Wood, attorney,
per P. F. Larner, asso. atty

UNITED STATES PATENT OFFICE.

FRANCIS D. BLISS, OF NEW HAVEN, CONNECTICUT, ASSIGNOR OF ONE-HALF HIS RIGHT TO C. W. TUTTLE, OF SAME PLACE.

IMPROVEMENT IN DUST-PANS.

Specification forming part of Letters Patent No. 162,524, dated April 27, 1875; application filed March 31, 1875.

*To all whom it may concern:*

Be it known that I, FRANCIS D. BLISS, of the city and county of New Haven, in the State of Connecticut, have invented certain new and useful Improvements in Dust-Pans.

My said improvements relate to that class of dust-pans which are provided with devices for self-maintaining the pan in proper position on a floor or carpet, that it may readily receive dust or dirt from in front of a brush or broom, and which also practically prevent movement of the pan during that operation.

As heretofore constructed, the supporting devices have been attached to the pan in a variety of methods; and my invention consists in combining, with the handle of the dust-pan, a leg or brace, which, when not in use, is located within, or is laid parallel with, the handle, and is entirely out of the way, thus not only rendering the device more compact, but also rendering it more convenient when used in the manner of dust-pans which are not provided with such devices; and I do hereby declare that the following specification, taken in connection with the drawings furnished and forming a part of the same, is a clear and accurate description of my invention.

Referring to the drawings, Figures 1, 2, 3, and 4 represent a dust-pan and handles of different construction which embody my invention.

Figure 3:
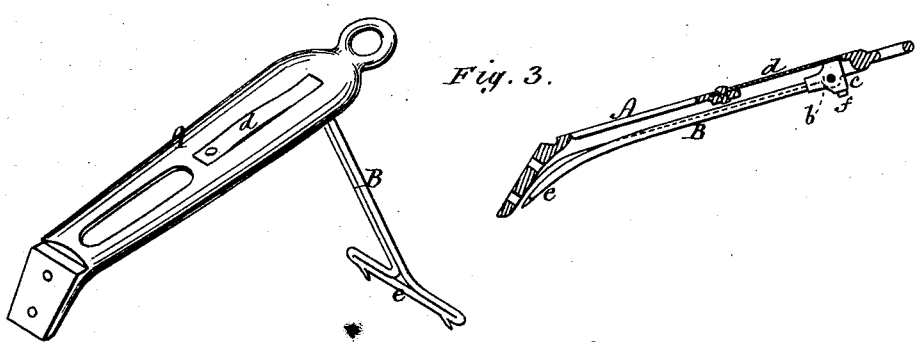
Figure 4:
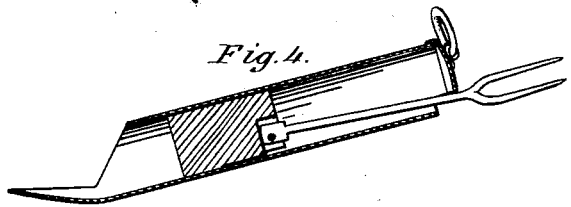

In Fig. 1, the handle A is of cast-iron and skeletonized in order that it may be as light as possible consistent with requisite strength. It may be riveted or soldered to the pan. In this figure the brace-leg B is composed of iron wire, and so bent as to form a fork-shaped foot or base having prongs $a$. At its opposite end it is pivoted to the handle on the under side near the end, and arranged to fold and partially occupy the space formed on the under side of the handle. At the point of pivoting, the leg is squared up, or it may be furnished with a head-block, as at $b$, which has a plane surface, as at $c$. On the upper side of the handle is a spring, $d$, riveted so as to place its free end in contact with the head-block at a point beyond the pivot on which the leg turns. It will be seen in Fig. 2 that this spring serves to hold the leg snugly in place when folded under the handle, and at the same time holds it in proper position for the leg to serve as a brace when turned outward. In Fig. 3 is shown a handle of slightly different construction from that shown in Fig. 1, but involving the same principle. In this case the handle A is of cast-iron, convex on its upper surface, concave below, and also skeletonized to secure lightness, at the same time possessing the requisite strength. The brace-leg B is also composed of iron wire, and is so bent as to form a broad foot at $e$, which is provided with teeth, as shown. The leg is pivoted at its opposite end to the handle, and arranged to fold and partially occupy the space formed by the concave surface of the under side of the handle. The head-block $b$, in this instance, is provided with the plane surface $c$, and also a knob, $f$. When the leg is turned outward, the knob $f$ is in bearing contact with the adjacent surface of the handle, the spring $d$ forcing it into said contact, and causing the leg or brace to be rigidly held in that position. In Fig. 4 I show the ordinary and well-known form of hollow tin handle. This style of handle may also be employed with the leg, as shown in Fig. 1, provided a long slot be made in its lower side, through which the leg may move to and from its working position. In such constructions the spring will be secured to the handle in like manner as already described. With the handle shown in Fig. 4, I have, however, shown a leg or brace of substantially the character as that already described; but instead of having the leg pivoted at a fixed point, it is pivoted to a block which slides within the handle, and instead of simply swinging out as in the first instance, it is moved out, longitudinally and then swung downward, occupying, when so placed, a position corresponding to the working position of the brace in the first instance. A spring may be attached to the sliding block, and arranged to bear upon the head-block of the leg in substantially the same manner as is shown in Fig. 1. In both cases the leg or brace is, when not in use, folded parallel with the handle, and practically embraced within it.

In dust-pans as heretofore constructed with devices intended to effect the general object of my invention, said devices have either been rigidly or adjustably attached to the pan closely adjacent to its junction with the handle, or on the handle in the form of a brush-holding hook adjacent to the pan. If the elevating and holding device be rigidly attached to the pan, it prevents that proper depression which is sometimes desired in its use, and as it is therefore important that it be adjustable it is equally important that it be readily set, and when not desired that it occupy such a position as will prevent it from interfering with the convenient use of the pan when the particular functions of the leg or brace are not desired. When the leg or brace is attached to the handle as herein described, it is readily set for use, or placed wholly out of the way when the pan is to be employed in the ordinary manner. The spring, by holding the leg firmly in both positions, adds much to the convenient utility of the pan, because the contact therewith of a brush or broom in sweeping dirt into the pan is not liable to throw it out of position. When the leg is not required, the spring also prevents it from moving out of place, and thereby keeps it from being an impediment in ordinary usage.

Having thus described my invention, I claim as new and as of my invention—

1. A dust-pan provided with a leg or brace, which is attached to the handle by a pivoted connection, and arranged to fold within or parallel with the handle, substantially as described.

2. The combination, in a dust-pan handle, of a leg or brace and a double-acting spring, substantially as described.

FRANCIS D. BLISS.

Witnesses:
MARCELLO NEWCOMB,
JNO. J. RUSSELL.